United States Patent
Brunner et al.

(10) Patent No.: US 9,296,882 B2
(45) Date of Patent: Mar. 29, 2016

(54) METHODS FOR INCREASING THROUGHPUT RATES OF SOLID-STATE EXTRUSION DEVICES

(71) Applicant: Zzyzx Polymers LLC, Allentown, PA (US)

(72) Inventors: Philip Brunner, East Stroudsburg, PA (US); Mark Tapsak, Orangeville, PA (US); Michael Janse, San Jose, CA (US)

(73) Assignee: ZZYZX POLYMERS LLC, Allentown, PA (US)

( * ) Notice: Subject to any disclaimer, the term of this patent is extended or adjusted under 35 U.S.C. 154(b) by 0 days.

(21) Appl. No.: 14/475,926

(22) Filed: Sep. 3, 2014

(65) Prior Publication Data

US 2015/0065616 A1   Mar. 5, 2015

Related U.S. Application Data

(60) Provisional application No. 61/873,790, filed on Sep. 4, 2013.

(51) Int. Cl.
*B29C 47/40* (2006.01)
*B29C 47/92* (2006.01)
(Continued)

(52) U.S. Cl.
CPC .............. *C08L 23/06* (2013.01); *B29C 47/0004* (2013.01); *B29C 47/1081* (2013.01); *B29C 47/402* (2013.01); *B29C 47/92* (2013.01); *C08K 3/04* (2013.01); *C08L 23/12* (2013.01); *B29C 47/0845* (2013.01); *B29C 47/1009* (2013.01); *B29C 47/1027* (2013.01); *B29C 47/1063* (2013.01); *B29C 47/1072* (2013.01); *B29C 2947/92704* (2013.01); *B29C 2947/92942* (2013.01); *B29K 2021/00* (2013.01); *B29K 2023/00* (2013.01);
(Continued)

(58) Field of Classification Search
None
See application file for complete search history.

(56) References Cited

U.S. PATENT DOCUMENTS 3,946,803 A   3/1976 Heitzer et al.
4,147,518 A   4/1979 Dehart et al.
(Continued)

FOREIGN PATENT DOCUMENTS

WO   WO 2012/085705 A1   6/2012
WO   WO 2012/126574 A1   9/2012
(Continued)

OTHER PUBLICATIONS

Torkelson, U.S. Appl. No. 12/566,342, filed Sep. 24, 2009, entitled "Polymer-Cellulose Composites via Solid-State Shear Pulverization," 83 pages.
(Continued)

*Primary Examiner* — Vu A Nguyen
(74) *Attorney, Agent, or Firm* — Pepper Hamilton LLP

(57) ABSTRACT

A method for improving the throughput of solid-state shear pulverization and solid-state melt-extrusion devices may include the addition of a heat absorbing material with a mixture of polymeric materials in an extruder. The extruder may include one or more extrusion screws. One or more portions of the one or more extrusion screws, one or more barrel sections, and/or one or more extruder work zones may be temperature controlled to maintain a temperature of the polymeric mixture in contact therewith at or below the liquefication temperature of the polymeric materials. The liquefication temperature may be a melting point of a semi-crystalline polymer or a glass transition temperature of an amorphous polymer.

26 Claims, 4 Drawing Sheets

(51) Int. Cl.

| | | |
|---|---|---|
| C08L 23/06 | (2006.01) | |
| B29C 47/00 | (2006.01) | |
| C08L 23/12 | (2006.01) | |
| C08K 3/04 | (2006.01) | |
| B29K 23/00 | (2006.01) | |
| B29K 401/00 | (2006.01) | |
| B29K 509/00 | (2006.01) | |
| B29K 511/00 | (2006.01) | |
| B29C 47/08 | (2006.01) | |
| B29C 47/10 | (2006.01) | |
| B29K 21/00 | (2006.01) | |
| B29K 63/00 | (2006.01) | |
| B29K 67/00 | (2006.01) | |
| B29K 77/00 | (2006.01) | |

(52) U.S. Cl.
CPC ..... *B29K 2023/0633* (2013.01); *B29K 2063/00* (2013.01); *B29K 2067/00* (2013.01); *B29K 2067/046* (2013.01); *B29K 2077/00* (2013.01); *B29K 2401/00* (2013.01); *B29K 2509/00* (2013.01); *B29K 2511/00* (2013.01); *C08L 2205/025* (2013.01); *C08L 2205/03* (2013.01); *C08L 2205/035* (2013.01); *C08L 2207/066* (2013.01); *C08L 2207/20* (2013.01)

(56) References Cited

U.S. PATENT DOCUMENTS

| | | | |
|---|---|---|---|
| 5,395,055 | A | 3/1995 | Shutov et al. |
| 5,409,646 | A * | 4/1995 | Menon et al. ............... 264/28 |
| 5,456,923 | A | 10/1995 | Nakamichi et al. |
| 5,788,889 | A | 8/1998 | DeMello et al. |
| 5,814,673 | A | 9/1998 | Khait |
| 5,843,489 | A | 12/1998 | Nakano |
| 6,180,685 | B1 | 1/2001 | Khait |
| 6,479,003 | B1 | 11/2002 | Furgiuele et al. |
| 6,494,390 | B1 | 12/2002 | Khait et al. |
| 6,797,216 | B2 | 9/2004 | Furgiuele et al. |
| 6,818,173 | B1 | 11/2004 | Khait |
| 6,849,215 | B2 | 2/2005 | Khait |
| 7,223,359 | B2 | 5/2007 | Torkelson et al. |
| 7,785,512 | B1 | 8/2010 | Pathak |
| 7,906,053 | B1 | 3/2011 | Torkelson et al. |
| 8,129,477 | B1 | 3/2012 | Zhang et al. |
| 8,162,647 | B2 | 4/2012 | Kim |
| 8,303,876 | B1 | 11/2012 | Torkelson et al. |
| 8,304,462 | B2 | 11/2012 | Lau et al. |
| 8,410,245 | B2 | 4/2013 | Torkelson et al. |
| 8,445,032 | B2 | 5/2013 | Topolkaraev et al. |
| 8,550,386 | B2 | 10/2013 | Topolkaraev et al. |
| 8,597,557 | B1 | 12/2013 | Torkelson et al. |
| 8,734,696 | B1 | 5/2014 | Torkelson et al. |
| 2004/0234641 | A1 | 11/2004 | Ueda et al. |
| 2011/0037193 | A1 | 2/2011 | Takada et al. |
| 2012/0029145 | A1 | 2/2012 | Brown |
| 2012/0228793 | A1 | 9/2012 | Lindenfelzer et al. |
| 2013/0113135 | A1* | 5/2013 | Wakabayashi et al. .. 264/211.24 |
| 2013/0260253 | A1 | 10/2013 | Otsuki et al. |
| 2014/0066300 | A1 | 3/2014 | Topolkaraev et al. |
| 2014/0088243 | A1 | 3/2014 | Torkelson et al. |

FOREIGN PATENT DOCUMENTS

| | | |
|---|---|---|
| WO | WO 2013/059321 A1 | 4/2013 |
| WO | WO 2014/047591 A1 | 3/2014 |

OTHER PUBLICATIONS

Brunner, "Overcoming Sustainability and Energy Challenges in Polymer Science via Solid-State Shear Pulverization," *Diss.*, Northwestern University, 340 pages, 2013.

Brunner et al., "Processing-Structure-Property Relationships in Solid-State Shear Pulverization: Parametric Study of Specific Energy," *Polym. Eng. Sci.*, 52(7):1555-1564, 2012.

Brunner et al., "Overcoming Technological Issues Associated with Color Additives in Rotational Molding via SSSP," *Plastics Engineering*, 68(9):28-34, 2012.

Diop et al., "Maleic anhydride functionalization of polypropylene with suppressed molecular weight reduction via solid-state shear pulverization," *Polymer*, 54:4143-4154, 2013.

Diop, "Solid-State Shear Pulverization: Post-Polymerization Modification of Polypropylene and Dispersion of Polymer Blends," *Diss.*, Northwestern University, 361 pages, 2014.

Diop et al., "Ester Functionalization of Polypropylene via Controlled Decomposition of Benzoyl Peroxide during Solid-State Shear Pulverization," *Macromolecules*, 46:7834-7844, 2013.

Flores, "Biobased and Biodegradeable Polymer Blends and Nanocomposites with Superior Dispersion and Physical Properties Created Using Solid-State Shear Pulverization," *Diss.*, Northwestern University, 180 pages, 2008.

Furgiuele et al., "Efficient Mixing of Polymer Blends of Extreme Viscosity Ratio: Elimination of Phase Inversion Via Solid-State Shear Pulverization," *Polymer Engineering and Science*, 40(6):1447-1457, 2000.

Furgiuele et al., "Novel Strategy for Polymer Blend Compatibilization: Solid-State Shear Pulverization," *Macromolecules*, 33(2):225-228, 2000.

Ganglani et al., "Trace Levels of Mechanochemical Effects in Pulverized Polyolefins," *J. Appl. Polym. Sci.*, 80:671-679, 2001.

Ganglani et al., "Influence of cure via network structure on mechanical properties of a free-radical polymerizing thermoset," *Polymer*, 43:2747-2760, 2002.

International Search Report mailed Nov. 13, 2014 for International Application No. PCT/US2014/053845 filed Sep. 3, 2014.

Iyer et al., "Novel, Synergistic Composites of Polypropylene and Rice Husk Ash: Sustainable Resource Hybrids Prepared by Solid-State Shear Pulverization," *Polymer Composites*, 34:1211-1221, 2013.

Iyer et al., "Green Composites of Polypropylene and Eggshell: Effective Biofiller Size Reduction and Dispersion by Single-Step Processing with Solid-State Shear Pulverization," *Composites Science and Technology*, 102:152-160, 2014.

Kasimatis et al., "Kinetic Stability of the Well-Exfoliated State in Polypropylene-Clay Nanocomposites Made by Solid-State Shear Pulverization," *SPE ANTEC*, 62:1503-1507, 2004.

Kasimatis et al., "Polymer Nanocomposites by Pulverization. Enhanced Properties and Dispersion," *SPE ANTEC*, 63:1965-1969, 2005.

Khait et al., "A New Polymer Processing Technology for Polymer Blends with Unmatched Viscosity: Solid-State Shear Pulverization ($S^3P$)," *Internat. Polym. Proc.*, 15:343-347, 2000.

Khait et al., "Solid-State Shear Pulverization of Plastics: A Green Recycling Process," *Polym.-Plast. Tech. Eng.*, 38:445-457, 1999.

Khait et al., "Effects of Multiple Processing Cycles on Post-Consumer Plastics Recycled via Solid-State Shear Pulverization," *SPE ANTEC*, 60:2925-2929 (2002).

Lebovitz, "Intimate Mixing and in Situ Compatibilization of Immiscible Polymer Blends via an Innovative Process: Solid-State Shear Pulverization (SSSP)," *Diss.*, Northwestern University, 368 pages, 2003.

Lebovitz et al., "Submicron Dispersed-Phase Particle Size in Polymer Blends: Overcoming the Taylor Limit via Solid-State Shear Pulverization," *Polymer*, 44:199-206, 2003.

Lebovitz et al. "Stabilization of Dispersed Phase to Static Coarsening: Polymer Blend Compatibilization via Solid-State Shear Pulverization," *Macromolecules*, 35:8672-8675, 2002.

Lebovitz et al., "In Situ Block Copolymer Formation during Solid-State Shear Pulverization: an Explanation for Blend Compatibilization via Interpolymer Radical Reactions," *Macromolecules*, 35:9716-9722, 2002.

Lebovitz et al., "Stability of Dispersed Phase to Static Coarsening: Polymer Blend Compatibilization via Solid-State Shear Pulverization," *SPE ANTEC*, 61:2328-2332, 2003.

(56) References Cited

OTHER PUBLICATIONS

Lebovitz et al., "Mixing and Compatibilization of Polymer Blends by Solid-State Shear Pulverization: Effects of Microscopic Composition, Processing Aids, and Pulverization Parameters," *SPE ANTEC*, 62:2699-2703, 2004.

Lebovitz et al., "Interpolymer Radical Coupling Reactions During Sonication of Polymer Solutions," *Polymer*, 44:2823-2828, 2003.

Masuda et al., "Dispersion and Major Property Enhancement in Polymer/Multiwall Carbon Nanotube Nanocomposites via Solid-State Shear Pulverization Followed by Melt Mixing," *Macromolecules*, 41:5974-5977, 2008.

Mu et al., "Cellular Structures of Carbon Nanotubes in a Polymer Matrix Improve Properties Relative to Composites with Dispersed Nanotubes," *Polymer*, 49:1332-1337, 2008.

Pierre, Tailoring the Physical Properties of Homopolymers and Polymer Nanocomposites via Solid-State Processing, *Diss.*, Northwestern University, 228 pages, 2009.

Pujari et al., "Preparation and Characterization of Multiwalled Carbon Nanotube Dispersions in Polypropylene: Melt Mixing versus Solid-State Shear Pulverization," *J. Polym. Sci. Part B: Polym. Phys.*, 47:1426-1436, 2009.

Tao, An Innovative Polymer Processing Method, Solid-State Shear Pulverization (SSSP): Intimate Mixing, Compatibilization, and Basic Understanding of the Process, *Diss.*, Northwestern University, 166 pages, 2006.

Tao et al., "Compatibilizing Immiscible Blends with Block Copolymers and Pulverization," *SPE ANTEC*, 63:2390-2394, 2005.

Tao et al., "Compatibilizing Effects of Block Copolymer Mixed with Immiscible Polymer Blends by Solid-State Shear Pulverization: Stabilizing the Dispersed Phase to Static Coarsening," *Polymer*, 46:4753-4761, 2005.

Tao et al., "Achievement of Quasi-Nanostructured Polymer Blends by Solid-State Shear Pulverization and Compatibilization by Gradient Copolymer Addition," *Polymer*, 47:67736781, 2006.

Wakabayashi et al., "Polypropylene-graphite nanocomposites made by solid-state shear pulverization: Effects of significantly exfoliated, unmodified graphite content on physical, mechanical and electrical properties," *Polymer*, 51:5525-5531, 2010.

Wakabayashi et al., "Polymer-Graphite Nanocomposites: Effective Dispersion and Major Property Enhancement via Solid-State Shear Pulverization," *Macromolecules*, 41:1905-1908, 2008.

Walker et al., "Polyethylene/Starch Blends with Enhanced Oxygen Barrier and Mechanical Properties: Effect of Granule Morphology Damage by Solid-State Shear Pulverization," *Polymer*, 48:1066-1074, 2007.

International Search Report and Written Opinion mailed Feb. 23, 2015 for PCT Patent Application No. PCT/US2014/064811.

* cited by examiner

METHODS FOR INCREASING THROUGHPUT RATES OF SOLID-STATE EXTRUSION DEVICES

CLAIM OF PRIORITY

This application claims benefit of and priority to U.S. Provisional Application No. 61/873,790 entitled "Methods for Increasing Throughput Rate for Solid-State Shear Pulverization (SSSP) or Solid-State Melt Extrusion (SSME)" filed Sep. 4, 2013, the disclosure of which is incorporated by reference herein in its entirety.

BACKGROUND

Solid state shear pulverization and solid state melt extrusion are techniques that may create polymeric materials used in the manufacture of polymer-based goods. Solid state pulverization may produce fine polymeric particulates, while solid state melt extrusion may produce extruded polymeric materials. It may be understood that the solid state melt extrusion process may begin with a solid state pulverization process of the starting materials before the particulates are heated and extruded.

Polymer particulates derived from solid state shear pulverization (hereafter, "SSSP") may be homo-polymeric (composed of a single polymer or single co-polymer) or heteropolymeric (composed of multiple types of polymers or co-polymers). Homo-polymeric particulates formed by SSSP techniques may be used to fabricate products or coatings requiring a single type of polymer. In one example, such homo-polymeric particulates may be fabricated from virgin material from a known supplier. Such single-polymeric materials may be required based on the known properties of the polymer and the intended use of the products.

Polylactic acid (hereafter "PLA"), a biologically based and biodegradable polymer that is cost-competitive with petroleum-based polymers, is one non-limiting example of a material that may be processed using SSSP technology. Technological applications of PLA have been limited because of its low thermal stability and toughness. Further, processed PLA may exhibit low crystallinity which may be due at least in part to its slow crystallization rate. As a result, the industrial use of PLA to form semi-crystalline products may be impractical in such processes such as injection molding, in which the cycle times are extremely fast. SSSP processing of PLA has shown to greatly enhance the crystallization kinetics, thereby permitting the production of semi-crystalline products in cycle times common for injection molding.

In some instances, hetero-polymeric particulates may be useful to form products or coatings for which the intended use does not require a single specified composition. Items such as plastic pallets, buckets, and trash bins, for example, may possess certain mechanical requirements but the composition of the items may not be important to their function. It may be understood that such products can be readily and inexpensively produced from unsorted or partially sorted recycled materials.

Additionally, specific combinations of polymer materials with fillers may be desired for improved product properties, such as increased tensile strength and reduced weight. One non-limiting example of a filler material may include rice-husk ash (hereafter, "RHA"), which is mostly composed of silica. A combination of a polymer with RHA may be difficult to process with conventional techniques because RHA is heavily agglomerated. The agglomeration characteristics of RHA may reduce or prevent effective break-up of the RHA particulates and their uniform dispersal within a polymer-RHA composite. The resulting polymer composites may have degraded physical properties such as decreased tensile strength. SSSP has been shown to successfully process polymer-RHA composites at high RHA loadings, resulting in an end product having enhanced hardness and scratch resistance.

SUMMARY

As used herein, the term "liquefication" may be defined as a phase transition of a polymer material from a solid state to a softened, liquid, or near-liquid state. A "liquefication temperature" may be defined as a temperature at which the polymer material transitions from a solid state to a softened, liquid, or near-liquid state. For a semi-crystalline polymer, a "liquefication temperature" may correspond to a melting point temperature. For an amorphous polymer, a "liquefication temperature" may correspond to a glass transition temperature. Some polymers may exist as combinations or admixtures of semi-crystalline and amorphous phases, and therefore the "liquefication temperature" may refer to either a melting point temperature or a glass transition temperature depending on the material composition.

In an embodiment, a method of dispersing materials in a polymer composition may include introducing a first mixture into an extruder, in which the first mixture is composed of a polymeric mixture and a heat absorbing material, solid-state shearing the first mixture in an initial zone of the extruder to yield a dispersal material, in which the initial zone has a temperature less than or equal to a liquefication temperature of the polymeric mixture, and dispensing the dispersal material from the extruder.

In an embodiment, a method of dispersing materials in a fluid polymer composition may include introducing a first mixture into an extruder, in which the first mixture is composed of a polymeric mixture and a heat absorbing material, solid-state shearing the first mixture in an initial zone of the extruder to yield a sheared mixture, transporting the sheared mixture from the initial zone to a transition zone of the extruder, warming the sheared mixture in the transition zone to a first temperature, transporting the warmed sheared mixture from the transition zone to a heating zone of the extruder, mixing the warmed sheared mixture in the heating zone and heating the warmed sheared mixture to a second temperature that is greater than or equal to a liquefication temperature of the polymeric mixture, thereby forming a fluid dispersal mixture, and extruding the fluid dispersal mixture from the extruder.

DETAILED DESCRIPTION

Figure 1:
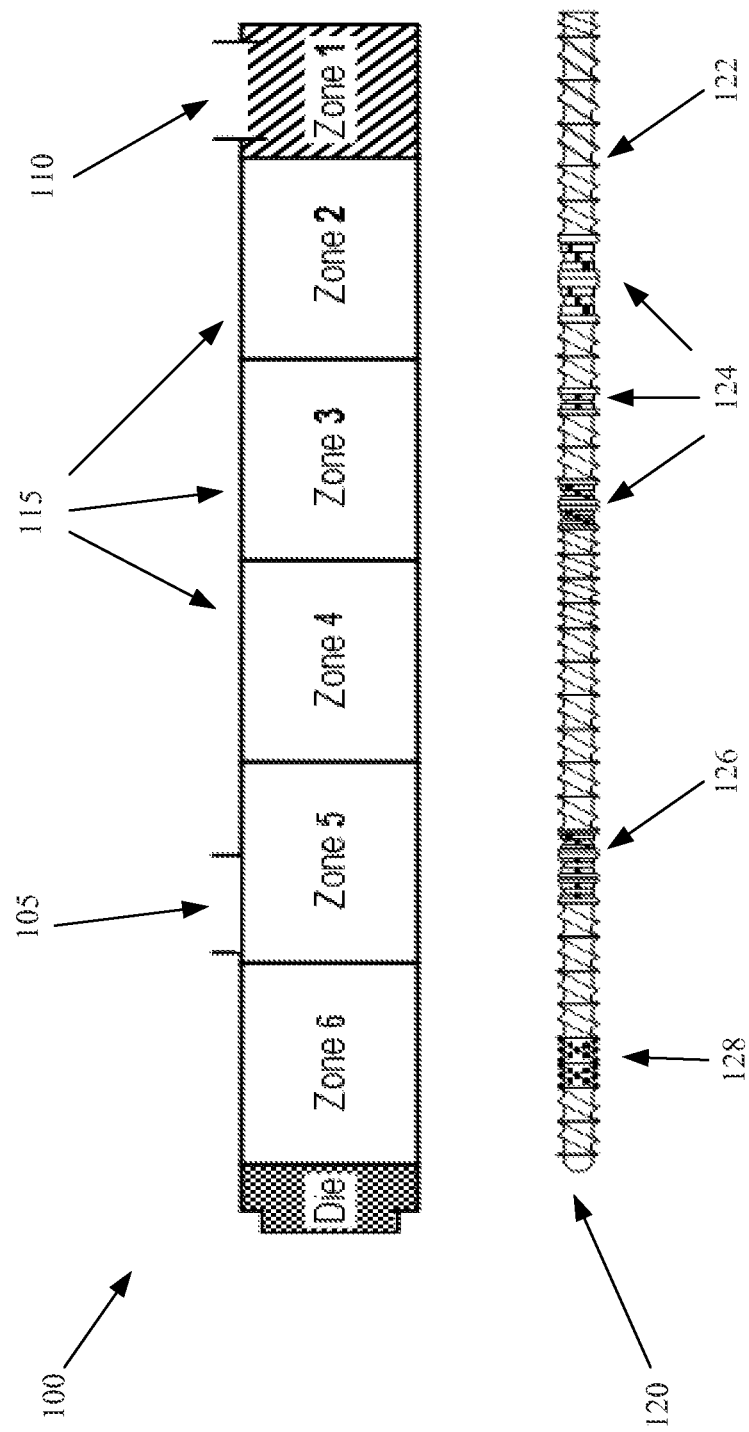
FIG. 1 illustrates a solid state shear pulverizer (SSSP) screw assembly in accordance with some embodiments.

Twin-screw extrusion (hereafter, "TSE") has been established as a prominent technique for processing homo-polymers, copolymers, and polymer blends from virgin and/or recycled sources. TSE has also been applied in the production of polymer composites and nano-composites. However, the shear mixing in TSE is often insufficiently rigorous to create a homogenous material in polymer blends. Additionally, TSE may not be effective for exfoliating (separating) or dispersing (spreading) fillers within a polymer matrix to form composites or nano-composites. Further, long TSE processing times may expose the extrusion materials to high temperature conditions that may result in thermal degradation of the initial materials. Such limitations may render TSE ineffective for producing high-performance polymer blends, composites, and nanocomposites.

Solid-state shear pulverization (hereafter, "SSSP") and solid-state melt-extrusion (hereafter, "SSME") techniques have been proven to achieve better dispersion of heterogeneous nucleating agents in homo-polymers compared to TSE processes. In addition, such techniques may improve the mixing of immiscible polymer blends, as well as exfoliating or dispersing fillers in polymer composites or nano-fillers in nanocomposites.

The ability to combine different polymer types into a hetero-polymeric composition may be limited by the physical-chemical properties of the individual polymers. As non-limiting examples, polymers that differ in one or more of their liquefication temperature, viscosity, and density may not readily combine in a homogeneous manner when in a liquid or softened state. It is understood that micro phase separation between polymers may occur for suspensions of liquid polymers that differ in their viscosity. Similarly, the combination of recycled polymers having added colorants may result in inhomogeneously colored products due to micro phase separation of the colorant materials. It is therefore apparent that combining polymers into hetero-polymeric compositions by liquefying the initial components may not result in favorable component mixing.

SSSP and SSME techniques may suffer from low production rates of hetero-polymeric materials because the initial materials must be processed below the liquefication temperature. During the pulverization process, the mechanical action of the pulverizing and mixing elements may lead to frictional heating of the initial polymeric material to temperatures above the liquefication temperatures of the polymers. Even if the temperature of the pulverization equipment is set below the liquefication temperature of the polymers, the low thermal conductivity typical of such polymeric materials may reduce the effectiveness of heat transfer to the cooled processing equipment. Therefore, the production rate of SSSP and SSME techniques may be reduced to maintain the frictional heating of the polymers to temperatures below their liquefication temperature. Thus, a need exists for modifications to SSSP and SSME techniques to achieve good hetero-polymeric mixing while improving the throughput rates of these processes.

FIG. 1 depicts a non-limiting configuration of an SSSP device. In FIG. 1, an extrusion screw 120 is housed within an enclosure 100 that maintains physical contact between the polymeric materials being processed and the active elements of the extrusion screw. The extrusion screw 120 may be composed of a shaft and modular elements, or may be a monolithic structure. The extrusion screw 120 may be composed of any material having physical characteristics capable of manipulating the polymeric materials, including, without limitation, stainless steel, aluminum, iron, high carbon steel, tempered steel, and surface-hardened metals.

Non-limiting examples of the active elements of the extrusion screw 120 may include one or more transport elements 122, mixing elements 124, and pulverizing elements 126, 128. The order, number, or type of the active elements along the extrusion screw 120 may not be limited to the configuration as depicted in FIG. 1, but may include any order of elements as may be required to transport, mix, combine, pulverize, or otherwise manipulate the polymeric material introduced into the SSSP. For example, additional active elements may be included to knead the polymeric material. It may be further understood that continuous operation (such as rotation) of the extrusion screw 120 may result in the polymeric material introduced at a feed chute 110 of the enclosure 100 to travel continuously along the length of the enclosure to a die end configured to dispense the final particulate mixture. In this manner, the polymer mixture may be continuously processed from introduction of the starting materials into the screw extruder to the receipt of the particulate material composed of the dispersed polymers. Along the length of the extrusion screw 120, the initial mixture of polymeric material may be subjected to mixing, grinding, and pulverizing forces generated by the mixing elements 124, pulverizing elements 126, 128, or other elements as required to achieve the required blending of materials and sizing of the final particulate material.

Although FIG. 1 illustrates a single extrusion screw 120, an SSSP device may be composed of one or more extrusion screws. In some embodiments, an SSSP device may have a plurality of extrusion screws 120 configured so that their active elements may interact to improve grinding or mixing the polymeric material. An example of such a device may be a twin extrusion screw extruder having a pair of extrusion screws proximate to each other and having their respective screw axes effectively parallel to each other.

The enclosure 100 may be divided into effective work zones, as depicted in FIG. 1 (see Zone 1-Zone 6). Such work zones may be defined in terms of the processing steps of the polymeric material and/or the temperature of the polymeric mixture within them. Thus, Zone 1 may correspond to a section in which the polymeric mixture is introduced into the extruder via the feed chute 110. One or more initial zones (for example Zone 2 and Zone 3) may correspond to sections in which the initial polymeric mixture is subjected to the action of the mixing elements 124. A buffer zone Zone 4 may be set between the mixing process and the pulverizing process occurring in one or more pulverizing zones (for example Zone 5 and Zone 6) in which the pulverizing elements 126, 128 may operate, respectively. In one embodiment, it may be understood that the one or more initial zones may incorporate all those work zones Zone 2-Zone 6 in which the polymeric mixture may be mixed, pulverized, kneaded, or otherwise physically manipulated.

Work zones Zone 1-Zone 6 may be defined functionally in terms of their operating temperatures or the mechanical processes occurring therein. Non-limiting examples of such work zones may have physical embodiments as barrel sections (for example, 115). Barrel sections 115 may be composed of segments of metal or other materials that physically surround one or more sections of the extruder screw 120 and one or more active elements such as mixing elements 124. In one non-limiting example, the enclosure 100 may be composed of one or more barrel sections 115 linked together. In another non-limiting example, the one or more barrel sections 115 may be separate structural elements contained within the enclosure 100. The one or more barrel sections 115 may be composed of any suitable material including, without limitation, stainless steel, aluminum, iron, high carbon steel, tempered steel, and surface-hardened metals.

It may be understood that the configuration of the extruder screw 120 and the active elements as disclosed in FIG. 1 is illustrative only, and is not intended to limit the possible configurations of the extruder screw or of its components.

Similarly, the descriptions of the work zones or barrel sections 115 in FIG. 1 are illustrative only and are not intended to suggest a single set of temperatures, activities, number, or relative locations of such work zones.

As disclosed above, frictional heating of the polymeric mixture during processing may lead to the mixture being heated to or above a liquefication temperature of at least some component of the mixture. Such frictional heating and liquefication may result in inhomogeneous mixing of the polymeric material. Thus, in one embodiment, the temperature of the at least one extrusion screw 120 of the extruder may be controlled to remove at least some of the friction-induced heat from the polymeric mixture. In one non-limiting embodiment, the temperature of the at least one extrusion screw 120 may be maintained at a temperature less than or equal to the liquefication temperature of the polymeric mixture. Table I presents exemplary polymeric materials and their liquefication temperatures.

TABLE I

| Polymeric Material | Type of Material | Liquefication Temperature (Melting Point) | Liquefication Temperature (Glass Transition) |
| --- | --- | --- | --- |
| Polystyrene | Amorphous/Semi-crystalline | 464° F. (240° C.) | 212° F. (100° C.) |
| Polyethylene (high density) | Amorphous/Semi-crystalline | 248° F.-356° F. (120° C.-180° C.) | −130° F. (−90° C.) |
| Polypropylene | Amorphous/Semi-crystalline | 266° F.-340° F. (130° C.-171° C.) | 6.8° F. (−14° C.) |
| Polycarbonate | Amorphous/Semi-crystalline | 297° F. (147° C.) | 302° F. (150° C.) |
| Nylon 6,6 | Amorphous/Semi-crystalline | 135° F. (57° C.) | 509° F. (265° C.) |
| Polymethylmethacrylate | Amorphous | | 221° F. (105° C.) |
| Polyvinyl Chloride | Amorophous/Semi-Crystalline | 414° F. (212° C.) | 187° F. (87° C.) |
| Polyethylene Terephthalate | Amorphous/Semi-Crystalline | 509° F. (265° C.) | 163° F. (73° C.) |

In some non-limiting examples, the temperature of at least one portion of the at least one extrusion screw 120 may be maintained at a temperature of about 35° F. to about 45° F. (about 1.7° C. to about 7.2° C.). Some non-limiting examples of temperatures at which the at least one portion of the at least one extrusion screw 120 may be maintained may include a temperature of about 35° F. (about 1.7° C.), about 37° F. (about 2.8° C.), about 39° F. (about 3.9° C.), about 40° F. (about 4.4° C.), about 42° F. (about 5.6° C.), about 44° F. (about 6.7° C.), about 45° F. (about 7.2° C.), or ranges between any two of these values including endpoints. As one example, the one or more extrusion screw 120 may be maintained at a temperature of about 40° F. (about 4.4° C.). Because the polymeric materials may not have high thermal conductivity, the extrusion screw 120 may be maintained at temperatures significantly lower than the liquefication temperature of the polymer in order to maintain the polymeric material in a solid state. For example, it may be necessary to maintain the extrusion screw 120 temperature at about 12° F. (about −11° C.) in order to maintain the polymeric materials at about 38° F. (about 3.3° C.) during the manipulation steps of the extruder.

A polymeric mixture may comprise one or more polymeric materials. In some embodiments, the polymeric mixture may be composed of one or more of a homo-polymer, a polymer blend, a combination of a polymer and a filler, and a combination of a polymer and a nanofiller. In some non-limiting examples, the polymeric mixture may be composed of one or more homo-polymers such as a polyolefin, a polyester, a polyamide, an epoxy, and an elastomer or a co-polymer of a polyolefin, a polyester, or a polyamide.

In other non-limiting examples, the polymeric mixture may be composed of a polymer and a filler, in which the filler may be composed of one or more of a cellulose material, a rice husk ash, a talc material, a silica material, a clay material, a modified clay material, a graphite material, a modified graphite material, a graphene, a single-walled carbon nanotube material, and a multi-walled carbon nanotube material. In other non-limiting examples, the polymeric mixture may be composed of a polymer and a nano-filler, in which the nano-filler may be composed of one or more of a cellulose material, a rice husk ash, a talc material, a silica material, a clay material, a modified clay material, a graphite material, a modified graphite material, a graphene, a single-walled carbon nanotube material, and a multi-walled carbon nanotube material. Nano-fillers may be distinguished from fillers in that the nano-fillers may have particle sizes of about 1 nm to about 100 nm while fillers may have particle sizes of about 100 µm to about 1 cm. The amount of filler included in a polymeric mixture may range from about 0.001% by weight to about 99% by weight.

An alternative, or additional, method to maintain the polymeric materials at a temperature below the liquefication temperature during SSSP processing may include adding one or more heat absorbing materials to the polymeric mixture upon introduction into the extruder. In yet another method, the polymeric materials may be pre-cooled by exposing them to one or more heat absorbing materials prior to the introduction of the polymeric mixture into the extruder. Non-limiting examples of such heat absorbing materials may include one or more of dry ice, liquid nitrogen, and water. Additional heat absorbing materials may include a cold gas. In one non-limiting example, the polymeric mixture may be exposed to a cold gas before entering the extruder. Alternatively, the cold gas may be injected into the extruder at the feed chute 110 or at one or more gas-specific entry ports along the length of the extruder. In some embodiments, the heat absorbing gas may have a temperature less than or equal to the liquefication temperature of the polymeric mixture. Examples of such cold gas temperatures may include temperatures of about −184° F. to about 104° F. (about −120° C. to about 40° C.). Non-limiting examples of such heat absorbing gases may include one or more of cold argon, cold neon, cold carbon dioxide, and cold nitrogen.

It may be understood that the polymeric mixture in any of the one or more work zones or barrel sections 115 in an SSSP device as illustrated in FIG. 1 may be maintained at a temperature equal to or less than a liquefication temperature of any of the components of the polymeric mixture. Such work zones or barrel sections 115 may include, without limitation, a work zone in which the polymeric mixture is introduced into the extruder (for example, Zone 1), one or more initial zones (for example, Zone 2 and Zone 3), a buffer zone (for example Zone 4), one or more pulverizing zones (for example, Zone 5 and Zone 6), and a delivery zone (for example, Die).

The cold gas introduced into the extruder, or generated from other heat absorbing materials (such as gaseous carbon dioxide from dry ice) may be vented through one or more gas vents 105 at a downstream side of the extruder.

Figure 2:
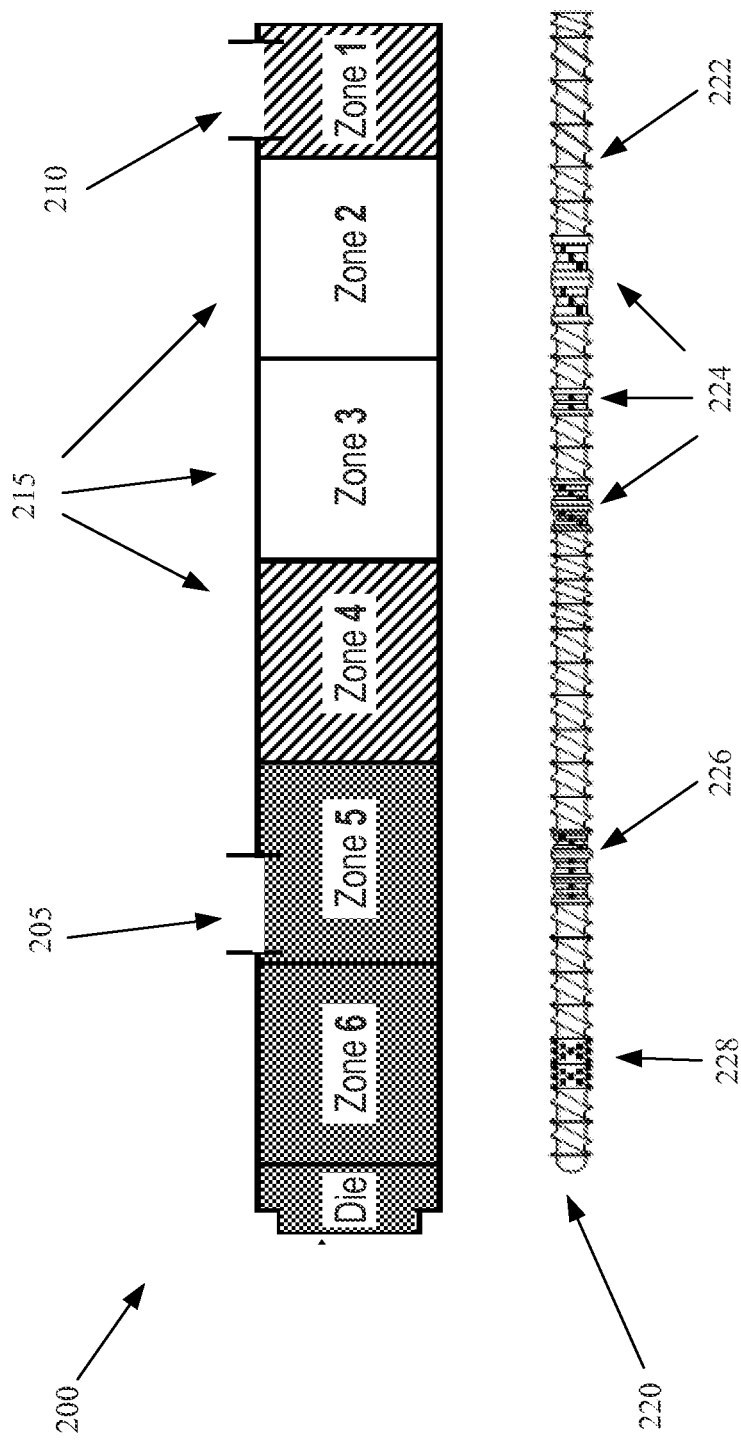
FIG. 2 illustrates a solid state melt extruder (SSME) screw assembly in accordance with some embodiments.

FIG. 2 depicts a non-limiting configuration of an SSME device. In FIG. 2, an extrusion screw 220 is housed within an enclosure 200 that maintains physical contact between the mixture of polymeric material being processed and the active elements of the extrusion screw. The extrusion screw 220 may be composed of a shaft and modular elements, or may be a monolithic structure. The extrusion screw 220 may be composed of any material having physical characteristics capable of manipulating the polymeric materials, including, without limitation, stainless steel, aluminum, iron, high carbon steel, tempered steel, and surface-hardened metals.

Non-limiting examples of the active elements of the extrusion screw 220 may include one or more transport elements 222, pulverizing elements 224, kneading elements 226, and mixing elements 228. The order, number, or type of the active elements along the extrusion screw 220 may not be limited to the configuration as depicted in FIG. 2, but may include any order of elements as may be required to transport, mix, combine, pulverize, or otherwise manipulate the polymeric material introduced into the SSME. It may be further understood that continuous operation (such as rotation) of the extrusion screw 220 may result in the polymeric material introduced at a feed chute 210 of the enclosure 200 to travel continuously along the length of the enclosure to a die end configured to extrude the final fluid mixture. In this manner, the polymer mixture may be continuously processed from introduction of the starting materials into the screw extruder to the receipt of the extruded fluid material composed of the dispersed polymers. Along the length of the extrusion screw 220, the initial mixture of polymeric material may be subjected to mixing, grinding, and pulverizing forces generated by the pulverizing elements 224, kneading elements 226, mixing elements 228, or other elements as required to achieve the required blending of materials.

Although FIG. 2 illustrates a single extrusion screw 220, an SSME device may be composed of one or more extrusion screws. In some embodiments, an SSME device may have a plurality of extrusion screws 220 configured so that their active elements may interact to improve grinding or mixing the polymeric material. An example of such a device may be a twin extrusion screw extruder having a pair of extrusion screws proximate to each other and having their respective screw axes effectively parallel to each other.

The enclosure 200 in which the one or more extrusion screws 220 are housed may be divided into effective work zones, as depicted in FIG. 2 (see Zone 1-Zone 6). Such work zones may be defined in terms of their respective temperatures and/or the processing steps of the polymeric material within them. Thus, Zone 1 may correspond to a section in which the polymeric mixture is introduced into the extruder via the feed chute 210 at an ambient temperature. One or more initial zones (for example, Zone 2 and Zone 3) may correspond to sections in which the initial polymeric mixture may be subjected to the action of the pulverizing elements 224 thereby producing a sheared mixture of the polymer material. During the pulverization process, the polymeric material may be kept at a temperature at or below the liquefication temperature of the polymeric mixture. Thus, the one or more initial zones (Zone 2 and Zone 3) may include temperature control elements (for example, as part of the one or more extrusion screws 220) to maintain the temperature of the polymeric material in those work zones at or below the liquefication temperature of the polymeric mixture. Transition zone Zone 4 may be a buffer zone between the pulverizing process in the one or more initial zones (Zone 2 and Zone 3), and the kneading process occurring in one or more heating zones (for example Zone 5).

While the SSSP process produces particulate material, the SSME process incorporates an additional melt extrusion step. Consequently, the SSME extruder depicted in FIG. 2 includes additional processing steps to melt the particulate polymeric mixture to produce an extruded composition such as a wire, a sheet, a tube, a multi-lumen tube, or any other profile extruded from a die commonly known to those having ordinary skill in the art. The melting process may occur for example in one or more heating zones (for example, in Zone 5 and Zone 6) in which the kneading elements 226, and mixing elements 228 may operate, respectively. The temperature in the zones manipulating the melted sheared mixture may be greater than or equal to a liquefication temperature of the polymeric mixture. Because the sheared material produced in the one or more initial zones (Zone 2 and Zone 3) may be at a temperature at or below the liquefication temperature of the polymeric mixture, and the melted material in the one or more heating zones (Zone 5 and Zone 6) may be at a temperature at or above the liquefication temperature of the polymeric mixture, the sheared mixture transported from Zone 3 to Zone 5 may be at an intermediate temperature as it is transported through the transition zone Zone 4. As a non-limiting example, the polymeric mixture in the one or more initial zones (Zone 2 and Zone 3) may be maintained at a temperature of about 38° F. (about 3.3° C.), the melted sheared mixture in the one or more heating zones (Zone 5 and Zone 6) may be maintained at a temperature of about 400° F. (about 204° C.), and the transported sheared material may have an average temperature of about 70° F. (about 21° C.) as it transits through transition zone Zone 4. It may be appreciated that the sheared mixture may be warmed from a temperature at or below a liquefication temperature to a temperature at or above the liquefication temperature of the polymer as it is transferred through the transition zone.

Work zones Zone 1-Zone 6 may be defined functionally in terms of their operating temperatures or the mechanical processes occurring therein. Non-limiting examples of such work zones may have physical embodiments as barrel sections (for example, 215). Barrel sections 215 may be composed of segments of metal or other materials that may physically surround one or more sections of the extruder screw 220 and one or more active elements such as pulverizing elements 224. In one non-limiting example, the enclosure 200 may be composed of one or more barrel sections 215 linked together. In another non-limiting example, the one or more barrel sections 215 may be separate structural elements contained within the enclosure 200. The one or more barrel sections 215 may be composed of any suitable material including, without limitation, stainless steel, aluminum, iron, high carbon steel, tempered steel, and surface-hardened metals.

It may be understood that the configuration of the extruder screw 220 and the active elements as disclosed in FIG. 2 is illustrative only, and is not intended to limit the possible configurations of the extruder screw or of its components.

Similarly, the descriptions of the work zones and barrel sections 215 in FIG. 2 are illustrative only, and are not intended to suggest a single set of temperatures, activities, or number of such work zones.

As disclosed above, frictional heating of the polymeric mixture during processing may lead to the mixture being heated to or above a liquefication temperature of at least some component of the mixture. Such frictional heating and liquefication may result in inhomogeneous mixing of the polymeric material during pulverization. In one non-limiting embodiment, the temperature of one or more portions of the at least one extrusion screw 220 having active elements that may pulverize the polymer mixture (for example, in one or more initial zones such as Zone 2 and Zone 3) may be maintained at a temperature less than or equal to the liquefication temperature of the polymeric mixture. In some non-limiting examples, the temperature of the one or more portions of the at least one extrusion screw 220 having active elements to pulverize the polymer mixture may be maintained at a temperature of about 35° F. to about 45° F. (about 1.7° C. to about 7.2° C.). Some non-limiting examples of temperatures at which at least one portion of the at least one extrusion screw 220 may be maintained may include a temperature of about 35° F. (about 1.7° C.), about 37° F. (about 2.8° C.), about 39° F. (about 3.9° C.), about 40° F. (about 4.4° C.), about 42° F. (about 5.6° C.), about 44° F. (about 6.7° C.), about 45° F. (about 7.2° C.), or ranges between any two of these values including endpoints.

Similarly, the temperature of one or more portions of the at least one extrusion screw 220 having active elements to mix or knead the melted sheared polymer mixture (for example, in one or more heating zones such as Zone 5 and Zone 6) may be maintained at a temperature greater than or equal to the liquefication temperature of the polymeric mixture. In some non-limiting examples, the temperature of one or more portions of the at least one extrusion screw 220 having active elements to mix or knead the melted polymer mixture may be maintained at a temperature of about 90° F. to about 500° F. (about 32° C. to about 260° C.). Some non-limiting examples of temperatures at which the at least one extrusion screw 220 may be maintained to mix or knead the melted polymer mixture may include a temperature of about 90° F. (about 32° C.), about 199° F. (about 93° C.), about 250° F. (about 121° C.), about 300° F. (about 149° C.), about 351° F. (about 177° C.), about 399° F. (about 204° C.), about 450° F. (about 232° C.), about 500° F. (about 260° C.), or ranges between any two of these values including endpoints.

An alternative, or additional, method to maintain the polymeric materials at a temperature below the liquefication temperature in an SSME device during the initial pulverization step may include adding one or more heat absorbing materials to the polymeric mixture upon introduction into the extruder. In yet another method, the polymeric materials may be pre-cooled by exposing them to one or more heat absorbing materials prior to the introduction of the polymeric mixture into the extruder. Non-limiting examples of such heat absorbing materials to which the polymeric materials may be exposed prior to introduction into the extruder may include one or more of dry ice, liquid nitrogen, and water.

Gases generated from heat absorbing materials (such as steam generated from added water) or from other processing steps may be vented through one or more gas vents 205 at a downstream side of the SSME extruder.

It may be understood that the heating and cooling of the polymeric material throughout its manipulation by the screw extrusion device, either using the SSSP or SSME technologies, may be accomplished by any appropriate means.

Cooling, for example, may be accomplished through the introduction of heat absorbing materials (solid, liquid, gas, or any combination thereof) with the polymeric mixture upon introduction into the extrusion device. For processes using SSSP technology, such heat absorbing materials may also be introduced, according to the temperature requirements, at any appropriate step in the processing of the polymeric material. Thus, for example, a heat absorbing gas may be introduced in an SSSP device at any work zone according to temperature requirements. Cooling may also be accomplished by cooling one or more portions of the extrusion screw according to the type of manipulation of the polymeric material contacting the extrusion screw (for example, in one or more initial zones such as Zone 2 and Zone 3 in FIG. 2). A portion of the enclosure 100 (FIG. 1) or 200 (FIG. 2) encompassing the extrusion screw or barrel sections 115 (FIG. 1) or 215 (FIG. 2) may also be cooled according to the type of manipulation of the polymeric material therein (for example, in Zone 2, Zone 3, Zone 4, and Zone 5 in FIG. 1). Such cooling may be accomplished through the use of one or more of a heat exchange coil, a compressor, a refrigerator, and a solid state cooling device.

With respect to SSME processing, heating of the polymeric material may be accomplished by heating one or more portions of the extrusion screw according to the type of manipulation of the polymeric material contacting the extrusion screw (for example, in one or more heating zones such as Zone 5 and Zone 6 in FIG. 2). A portion of the physical enclosure 200 of the extrusion screw or barrel section 215 may also be heated according to the type of manipulation of the polymeric material therein (for example, one or more heating zones such as Zone 5 and Zone 6 in FIG. 2). Such heating may be accomplished through the use of one or more of a resistive heating element, a heat transfer coil, a radiant heating device, and the introduction of a heated gas. Because some portions of an SSME processing device may be kept at a temperature at or above a liquefication temperature of the polymer mixer, while other portions may be kept at a temperature at or below a liquefication temperature, thermal insulating components or devices may be required to provide thermal barriers between the high temperature and low temperature portions of enclosure 200 or between barrel sections 215.

Figure 3:
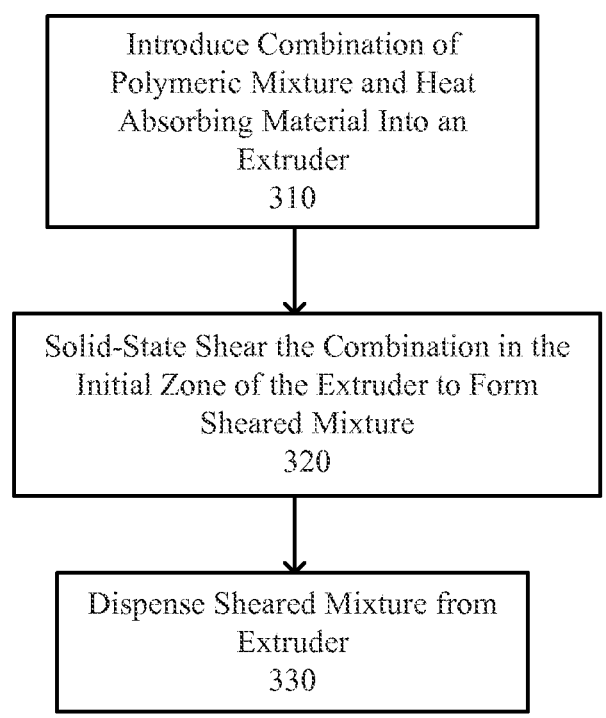
FIG. 3 is a flow chart of an embodiment of a method of improving the throughput of a solid state shear pulverizer.

FIG. 3 is a flow chart of an exemplary method for producing a particulate mixture of sheared and pulverized polymers using an SSSP device, as disclosed above. A combination of a polymeric mixture and a heat absorbing material may be introduced 310 into an extruder, such as a twin-screw extruder. A sheared mixture of the polymeric mixture may be produced in at least an initial zone of the extruder by means of solid-state shearing 320. Such a sheared mixture may be fabricated by any combination of mixing, pulverizing, or kneading the polymeric mixture by one or more active elements of the extruder. The sheared mixture may be dispensed 330 from the extruder at a dispensing end.

Figure 4:
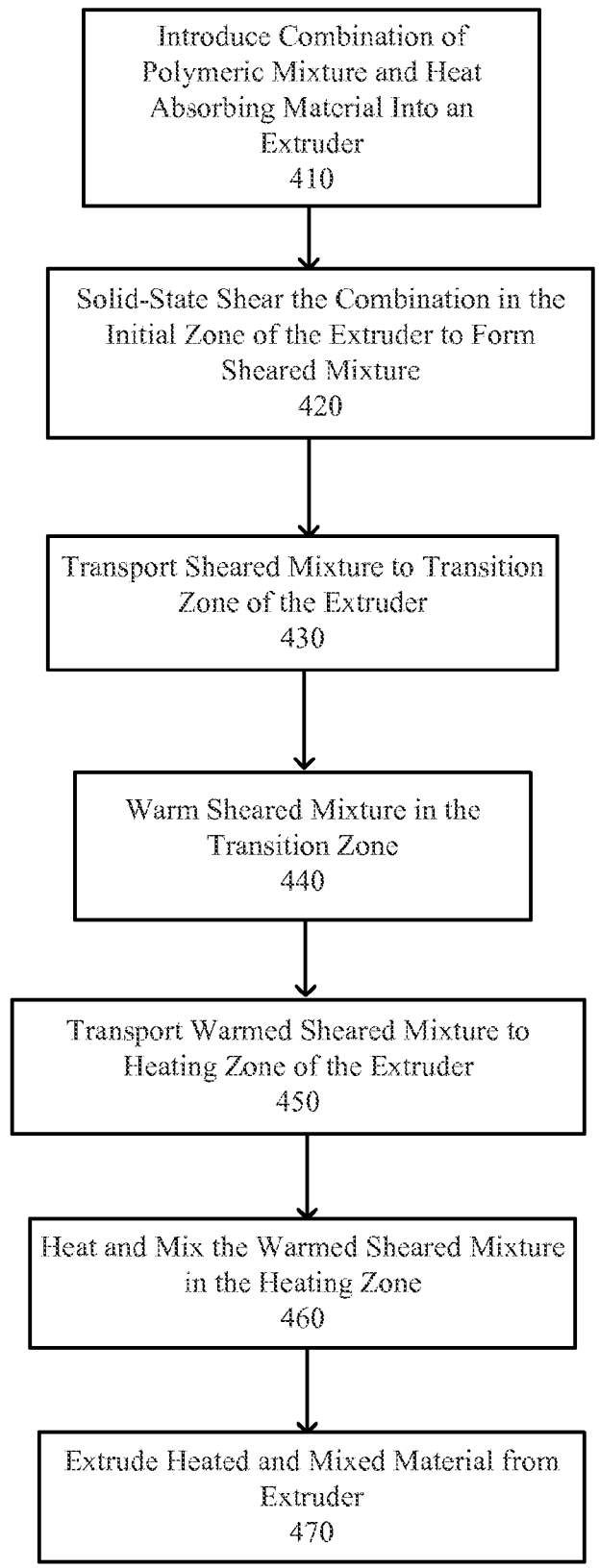
FIG. 4 is a flow chart of an embodiment of a method of improving the throughput of a solid state melt extruder.

FIG. 4 is a flow chart of an exemplary method for producing an extruded material formed by heating a mixture of sheared and pulverized polymers using an SSME device, as disclosed above. A combination of a polymeric mixture and a heat absorbing material may be introduced 410 into an extruder, such as a twin-screw extruder. A sheared mixture of the polymeric mixture may be produced in at least an initial zone of the extruder by means of solid-state shearing 420. Such a sheared mixture may be fabricated by any combination of mixing, pulverizing, or kneading the polymeric mixture by one or more active elements of the extruder. The sheared mixture may be transported 430 through a transition zone of the extruder in which it may be warmed 440 from an initial temperature in the initial zone to a temperature in a heating zone. The warmed sheared mixture may be transported 450 from the transition zone into a heating zone of the extruder. The warmed sheared mixture may be heated and mixed 460 in a heating zone of the extruder, wherein the sheared mixture may be heated to or above a liquefication temperature to produce a liquid or semi-liquid polymer mixture. The mixed and heated polymer mixture may be extruded 470 from the extruder.

EXAMPLES

Example 1

Exemplary Combinations of Polymeric Materials and Heat Absorbing Materials

Table II presents non-limiting examples of combinations of homo-polymeric materials, blends of virgin homo-polymers, and recycled homo-polymers along with heat absorbing materials that may be used according to the methods disclosed herein (values presented as weight percent of a total combination).

TABLE II

| | Material | | | | | | | | |
|---|---|---|---|---|---|---|---|---|---|
| | Virgin LDPE[1] (wt %) | Recycled LDPE[1] (wt %) | Virgin PP[2] (wt %) | Recycled PP[2] (wt %) | Virgin PS[3] (wt %) | Recycled PS[3] (wt %) | Liquid Nitrogen (wt %) | Water (wt %) | Dry Ice ($CO_2$) (wt %) |
| Sample 1 | 95 | 0 | 0 | 0 | 0 | 0 | 5 | 0 | 0 |
| Sample 2 | 90 | 5 | 0 | 0 | 0 | 0 | 0 | 0 | 5 |
| Sample 3 | 5 | 85 | 5 | 0 | 0 | 0 | 0 | 5 | 0 |
| Sample 4 | 0 | 0 | 90 | 0 | 5 | 0 | 0 | 0 | 5 |
| Sample 5 | 0 | 0 | 5 | 85 | 5 | 0 | 5 | 0 | 0 |
| Sample 6 | 0 | 0 | 0 | 0 | 90 | 5 | 0 | 0 | 5 |
| Sample 7 | 0 | 0 | 85 | 0 | 0 | 0 | 5 | 5 | 5 |
| Sample 8 | 0 | 5 | 0 | 5 | 0 | 80 | 0 | 5 | 5 |
| Sample 9 | 0 | 0 | 0 | 0 | 95 | 0 | 0 | 0 | 5 |
| Sample 10 | 5 | 5 | 5 | 5 | 5 | 60 | 5 | 5 | 5 |
| Sample 11 | 85 | 0 | 0 | 0 | 0 | 0 | 5 | 5 | 5 |
| Sample 12 | 10 | 75 | 0 | 0 | 5 | 0 | 5 | 5 | 0 |
| Sample 13 | 0 | 0 | 5 | 90 | 0 | 0 | 0 | 0 | 5 |
| Sample 14 | 0 | 0 | 10 | 0 | 75 | 5 | 5 | 0 | 5 |
| Sample 15 | 0 | 0 | 0 | 0 | 0 | 95 | 0 | 5 | 0 |

[1] LDPE: low density polyethylene
[2] PP: polypropylene
[3] PS: polystyrene

Many of the polymer combinations listed in Table II may be found in unsorted recycling work streams. In typical recycling work streams, the received recyclable materials may include a mixture of polymer-containing objects. Significant recycling costs may be accrued from sorting the recyclables by polymer type prior to further processing. Even then, some polymeric materials may differ in their liquefication temperatures, density, and other physical chemical properties despite having similar polymer types. Therefore, a materials recycling process, such as SSSP technology, that does not require extensive sorting of polymer-containing materials may have reduced costs compared to processes requiring extensive sorting. Additionally, blends of polypropylene and polyethylene may have useful properties for industrial applications.

Example 2

Exemplary Combinations of Polymeric Materials, Fillers, and Heat Absorbing Materials Table III presents non-limiting examples of combinations of homo-polymeric materials, blends of virgin homo-polymers, and recycled homo-polymers along with heat absorbing materials that may be used according to the methods disclosed herein (values presented as weight percent of a total combination).

TABLE III

| | Material | | | | | | | | |
|---|---|---|---|---|---|---|---|---|---|
| | Virgin LDPE[1] (wt %) | Recycled LDPE[1] (wt %) | Virgin PP[2] (wt %) | Recycled PP[2] (wt %) | Cellulose[3] (wt %) | Graphite (wt %) | Liquid Nitrogen (wt %) | Water (wt %) | Dry Ice ($CO_2$) (wt %) |
| Sample 1 | 90 | 0 | 0 | 0 | 5 | 0 | 5 | 0 | 0 |
| Sample 2 | 80 | 5 | 0 | 0 | 10 | 0 | 0 | 0 | 5 |
| Sample 3 | 5 | 65 | 5 | 0 | 20 | 0 | 0 | 5 | 0 |
| Sample 4 | 0 | 0 | 80 | 0 | 5 | 10 | 0 | 0 | 5 |
| Sample 5 | 0 | 0 | 5 | 60 | 30 | 0 | 5 | 0 | 0 |
| Sample 6 | 70 | 5 | 5 | 5 | 5 | 5 | 0 | 0 | 5 |
| Sample 7 | 0 | 5 | 75 | 5 | 0 | 0 | 5 | 5 | 5 |
| Sample 8 | 0 | 5 | 0 | 75 | 9 | 1 | 0 | 5 | 5 |
| Sample 9 | 0 | 0 | 45 | 0 | 50 | 0 | 0 | 0 | 5 |
| Sample 10 | 5 | 60 | 5 | 5 | 5 | 5 | 5 | 5 | 5 |
| Sample 11 | 85 | 0 | 5 | 0 | 0 | 0 | 5 | 0 | 5 |

TABLE III-continued

| | Material | | | | | | | | |
|---|---|---|---|---|---|---|---|---|---|
| | Virgin LDPE[1] (wt %) | Recycled LDPE[1] (wt %) | Virgin PP[2] (wt %) | Recycled PP[2] (wt %) | Cellulose[3] (wt %) | Graphite (wt %) | Liquid Nitrogen (wt %) | Water (wt %) | Dry Ice ($CO_2$) (wt %) |
| Sample 12 | 10 | 75 | 0 | 0 | 5 | 0 | 5 | 5 | 0 |
| Sample 13 | 0 | 0 | 5 | 90 | 0 | 0 | 0 | 0 | 5 |
| Sample 14 | 0 | 0 | 80 | 0 | 5 | 5 | 5 | 0 | 5 |
| Sample 15 | 75 | 0 | 0 | 0 | 0 | 20 | 0 | 5 | 0 |

[1]LDPE: low density polyethylene
[2]PP: polypropylene
[3]Cellulose may include cardboard, shredded paper, or other post-consumer or post-industrial cellulosic wastes.

Many of the polymer combinations listed in Table III may be found in unsorted recycling work streams. As disclosed above with respect to Table II, a materials recycling process, such as SSSP technology, that does not require extensive sorting of polymer-containing materials may have reduced costs compared to processes requiring extensive sorting. Further, SSSP technology may be well suited to produce well-dispersed fillers within a polymeric matrix, thereby leading to more consistent physical properties of the combined filler/polymer material and objects fabricated therefrom.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A method of dispersing materials in a polymer composition, the method comprising:
  introducing a first mixture into an extruder, wherein the first mixture comprises a polymeric mixture;
  controlling a first temperature of the first mixture by contacting a heat absorbing material with the first mixture to form a material combination;
  solid-state shearing the first mixture in the extruder to yield a dispersal material, wherein the first temperature is controlled to about 38° F. to about 70° F.; and
  dispensing the dispersal material from the extruder.

2. The method of claim 1, further comprising controlling a second temperature of one or more of at least one section of the at least one extrusion screw, at least one section of an enclosure of the extruder, and at least one barrel section of the extruder,
  wherein controlling the second temperature of one or more of the at least one section of the at least one extrusion screw, the at least one section of the enclosure of the extruder, and the at least one barrel section of the extruder comprises maintaining the second temperature of one or more of the at least one section of the at least one extrusion screw, the at least one section of the enclosure of the extruder, and the at least one barrel section of the extruder at about 35° F. to about 40° F.

3. The method of claim 1, wherein the polymeric mixture comprises one or more of a homo-polymer, a polymer blend, a combination of a polymer and a filler, and a combination of a polymer and a nanofiller.

4. The method of claim 1, wherein the polymeric mixture comprises one or more of a polyolefin, a polyester, a polyamide, an epoxy, and an elastomer.

5. The method of claim 1, wherein the polymeric mixture comprises a combination of a polymer and a filler, wherein the filler comprises one or more of a cellulose material, a rice husk ash, a talc material, a silica material, a clay material, a modified clay material, a graphite material, a modified graphite material, a graphene, a single-walled carbon nanotube material, and a multi-walled carbon nanotube material.

6. The method of claim 1, wherein the heat absorbing material comprises one or more of dry ice, liquid nitrogen, and water.

7. The method of claim 1, wherein the heat absorbing material comprises a gas.

8. The method of claim 7, wherein the gas has a temperature less than or equal to a liquefication temperature of the polymeric mixture.

9. The method of claim 7, wherein the gas has a temperature of about 184° F. to about 104° F.

10. The method of claim 7, wherein the gas comprises one or more of argon, neon, carbon dioxide, and nitrogen.

11. The method of claim 1, wherein the first temperature is a melting point of a semi-crystalline polymer of the first mixture.

12. The method of claim 1, wherein the first temperature is a glass transition temperature of an amorphous polymer of the first mixture.

13. A method of dispersing materials in a fluid polymer composition, the method comprising:
  introducing a first mixture into an extruder, wherein the first mixture comprises a polymeric mixture;
  controlling a first temperature of the first mixture by contacting a heat absorbing material with the first mixture to form a material combination, wherein the first temperature is controlled to about 38° F. to about 70° F.;
  solid-state shearing the first mixture in an initial zone of the extruder to yield a sheared mixture;
  transporting the sheared mixture from the initial zone to a transition zone of the extruder;
  warming the sheared mixture in the transition zone to a first temperature;
  transporting the warmed sheared mixture from the transition zone to a heating zone of the extruder;
  mixing the warmed sheared mixture in the heating zone and heating the warmed sheared mixture to a second temperature thereby forming a fluid dispersal mixture, wherein the second temperature is greater than or equal to a liquefication temperature of the polymeric mixture; and
  extruding the fluid dispersal mixture from the extruder.

14. The method of claim 13, wherein solid-state shearing of the first mixture comprises solid-state shearing of the first mixture at a temperature less than or equal to the liquefication temperature of the polymeric mixture.

15. The method of claim 13, wherein warming the sheared mixture in the transition zone to a first temperature comprises warming the sheared mixture in the transition zone to a temperature equal to or greater than the liquefication temperature of the polymeric mixture.

16. The method of claim 1, wherein the heat absorbing material comprises at least one of liquid nitrogen and dry ice, liquid nitrogen and water, dry ice and water, and liquid nitrogen, dry ice, and water.

17. The method of claim 1, wherein the heat absorbing material comprises liquid nitrogen and dry ice.

18. The method of claim 1, wherein the material combination comprises about 5% by weight of nitrogen and about 5% by weight of dry ice.

19. The method of claim 1, wherein the heat absorbing material comprises liquid nitrogen, dry ice, and water.

20. The method of claim 1, wherein the material combination comprises about 5% by weight of nitrogen, about 5% by weight of dry ice, and about 5% by weight of water.

21. The method of claim 1, wherein the first temperature is controlled to about 38° F.

22. The method of claim 1, wherein the material combination is formed prior to introducing the first mixture into the extruder.

23. The method of claim 13, wherein the heat absorbing material comprises at least one of liquid nitrogen and dry ice, liquid nitrogen and water, dry ice and water, and liquid nitrogen, dry ice, and water.

24. The method of claim 13, wherein the heat absorbing material comprises liquid nitrogen and dry ice.

25. The method of claim 13, wherein the heat absorbing material comprises liquid nitrogen, dry ice, and water.

26. The method of claim 13, wherein the material combination comprises about 5% by weight of nitrogen, about 5% by weight of dry ice, and about 5% by weight of water.

* * * * *